(12) United States Patent
Flannigan et al.

(10) Patent No.: US 9,671,788 B2
(45) Date of Patent: Jun. 6, 2017

(54) VERTICAL PATH CONTROL AUGMENTATION USING LATERAL CONTROL SURFACES

(75) Inventors: Sean J. Flannigan, Seattle, WA (US); Brian K. Rupnik, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1093 days.

(21) Appl. No.: 11/945,803

(22) Filed: Nov. 27, 2007

(65) Prior Publication Data

US 2009/0138144 A1 May 28, 2009

(51) Int. Cl.
| | |
|---|---|
| G05D 1/00 | (2006.01) |
| G05D 1/06 | (2006.01) |
| G05D 3/00 | (2006.01) |
| G06F 7/00 | (2006.01) |
| G06F 17/00 | (2006.01) |

(52) U.S. Cl.
CPC .................................. *G05D 1/0676* (2013.01)

(58) Field of Classification Search
None
See application file for complete search history.

(56) References Cited

U.S. PATENT DOCUMENTS

| | | | | |
|---|---|---|---|---|
| 3,333,795 A | | 8/1967 | Hattendorf et al. | |
| 3,343,221 A | * | 9/1967 | Yarrison | B29C 45/20 285/298 |
| 3,626,163 A | | 12/1971 | Dommasch | |
| 3,658,280 A | * | 4/1972 | McDonnell | G05D 1/0607 244/180 |
| 3,738,594 A | | 6/1973 | Donovan et al. | |
| 4,261,537 A | * | 4/1981 | Frosch | G05D 1/0607 244/181 |
| 4,377,848 A | * | 3/1983 | Flannigan | G05D 1/0607 244/180 |
| 4,617,633 A | | 10/1986 | McAllister | |
| 5,377,937 A | * | 1/1995 | LaMay | G05D 1/0676 244/185 |
| 5,823,479 A | | 10/1998 | Nield et al. | |
| 5,908,176 A | * | 6/1999 | Gilyard | B64C 13/18 244/130 |
| 6,154,693 A | * | 11/2000 | Aberschitz | G01S 5/0054 701/120 |
| 6,161,801 A | * | 12/2000 | Kelm | B64C 13/16 244/195 |

(Continued)

*Primary Examiner* — Imran Mustafa
(74) *Attorney, Agent, or Firm* — Miller, Matthias & Hull LLP

(57) ABSTRACT

In one embodiment of a method for reducing vertical position errors of an aircraft, the displacement of the aircraft from a commanded vertical path may be determined. A determination may be made as to whether a magnitude of a vertical path error meets criteria. No more steps of the method may be followed if the vertical path error does not meet the criteria, while the vertical path error may be converted into a delta lift command if the vertical path error meets the criteria. The delta lift command may be limited. The delta lift command may be converted into lateral surface position commands for control surfaces. The lateral surface position commands may be communicated to lateral control surface actuators to move the control surfaces according to the lateral surface position commands.

13 Claims, 4 Drawing Sheets

(56) References Cited

U.S. PATENT DOCUMENTS

| | | | | |
|---|---|---|---|---|
| 2002/0158168 A1* | 10/2002 | Greene | ............... | G05D 1/0676 |
| | | | | 244/186 |
| 2003/0034421 A1* | 2/2003 | Clark | ......................... | 244/75 R |
| 2003/0058134 A1* | 3/2003 | Sherry | ................ | G05D 1/0607 |
| | | | | 340/945 |
| 2003/0127569 A1* | 7/2003 | Bacon et al. | ................ | 244/195 |
| 2007/0185628 A1* | 8/2007 | Delaplace | ........... | G05D 1/0066 |
| | | | | 701/4 |
| 2009/0012657 A1* | 1/2009 | Knotts | ................ | G05D 1/0038 |
| | | | | 701/3 |
| 2009/0314897 A1* | 12/2009 | Boissenin | ................ | B64C 9/20 |
| | | | | 244/186 |

\* cited by examiner

VERTICAL PATH CONTROL AUGMENTATION USING LATERAL CONTROL SURFACES

BACKGROUND

The disclosure relates to aircraft flight control systems and specifically to the automatic control of an aircraft's flight path. Automatic pilot systems are widely used in the aviation industry to control the flight path of an aircraft. Conventional control systems typically utilize the elevator as the control surface for effecting changes in the aircraft's vertical path. One objective of the disclosure is to enhance the precision of vertical path control afforded by one or more conventional pitch control systems coupled with an automatic pilot system, both during landing and non-landing flight situations.

As a representative example, an automatic landing is a vertical path tracking task that requires precise vertical path control in order to achieve acceptable performance. Automatic landing capability is required for operations in the most severe low visibility weather, referred to as Category IIIB low weather minima, and is used in less restrictive weather minimums to enhance safety and reduce flight crew work load. An Automatic Landing System (ALS) provides the precise vertical and lateral path guidance necessary to meet the stringent performance requirements specified for low weather minimum operations.

The vertical path guidance provided by an ALS includes both glide path control and the flare maneuver. Precise control of vertical position relative to the desired vertical path is essential in order to achieve the performance required for Category III operations. The glide path provides the established descent gradient and longitudinal position reference for final approach flight path guidance. The flare maneuver provides the transition from the glide path to touchdown at the desired location on the runway. Ideally, the ALS will land the aircraft at the same point on the runway regardless of environment or facility. In other words, the design must be very robust given the wide range of environmental conditions, terrain, and runway characteristics that the aircraft will be subjected to during automatic landings. However, in practice the vertical path tracking provided by the ALS is significantly affected by shearing winds, terrain, and runway characteristics. Any enhancement of an existing autopilot design that improves vertical path tracking will reduce the impact of the aforementioned disturbances during automatic landing operations.

For automatic landings, the autopilot used in airplanes such as the 777, 757, 767, and 747-400 utilizes a vertical position control law design to generate an elevator command that provides glide path control and the flare maneuver. The elevator command is generated with an elevator vertical position feedback control system. The vertical position control law design produces a pitch attitude command that is proportional to the altitude error and altitude rate error and the integral of the altitude error. The error is defined as the difference between the command and the actual (as measured by a sensor). The pitch attitude command is converted into an elevator command that is used to move the elevator control surface. The design is tuned to provide accurate vertical path tracking with acceptable stability characteristics. One problem with relying solely on an elevator feedback control system for vertical position control is that high gains are usually required to achieve the desired vertical path tracking accuracy. However, excessively high gains in the elevator feedback control system can compromise the overall system stability, potentially resulting in interaction with aircraft structural modes. High gains in the elevator vertical position feedback control system can also result in excessive pitch activity that may be objectionable to the flight crew.

Autopilots typically utilize a predictive or feed forward elevator compensation of some sort in combination with elevator feedback control to achieve disturbance rejection. This combination of feed forward elevator compensation and elevator feedback control allow performance objectives to be met without resorting to excessively high and potentially destabilizing feedback gains. The types of elevator feed forward compensation utilized are typically either short term moment compensation or long term force compensation.

For short term moment compensation, a control surface command (elevator) is generated such that a moment is created that cancels the moment predicted to be generated by the disturbance. For long term force compensation, a pitch attitude command is generated to counteract the steady state trim changes due to a disturbance. Short term moment compensation tends to limit pitch attitude change in response to a disturbance, whereas long term force compensation tends to generate pitch attitude change in response to a disturbance. Short term moment compensation is used for balancing pitching moments due to changes in stabilizer, and changes in thrust and ground effects, but is not very effective for dealing with vertical path disturbance due to changing winds. Long term force compensation, on the other hand, is quite effective in countering the disturbances due to changing winds. However, during the flare maneuver, the pitch attitude changes resulting from long term force compensation tend to result in undesirable pitch activity from a fight crew acceptability standpoint.

During a landing there are also geometrical constraints that need to be considered. The pitch attitude of the airplane must be limited to prevent ground contact of the nose landing gear prior to the main landing gear and ground contact of the aft body (tail strike). While limiting the pitch attitude within the geometrical constraints reduces the probability of a nose gear first contact and tail strike during an automatic landing, the ability of the autopilot to maintain the commanded vertical path using a vertical position elevator feedback control system and feed forward elevator compensation can be diminished by these geometrical constraints. For example, during a flare maneuver, the geometrical constraints may prevent the autopilot from maneuvering as aggressively in response to the vertical path upset caused by shearing winds.

A method for reducing vertical position control errors of an aircraft is needed to decrease one or more problems associated with one or more of the existing methods.

SUMMARY

In one aspect of the disclosure, a method is disclosed for reducing vertical position control errors of an aircraft. In one step, displacement of the aircraft from a commanded vertical path may be determined. In another step, it may be determined whether a magnitude of a vertical path error is outside a pre-determined criteria. In still another step, no more steps of the method may be followed if the vertical path error is not outside the criteria, and the vertical path error may be converted into a delta lift command if the vertical path error is outside the criteria. In an additional step, the delta lift command may be limited and/or filtered. In yet another step, the limited and/or filtered delta lift command may be converted into lateral surface position commands. In another step, the lateral surface position commands may be communicated to lateral control surface actuators to move the control surfaces according to the lateral surface position commands such that the vertical position error may be reduced.

In another aspect of the disclosure, a method is disclosed for reducing vertical position errors of an aircraft. In one step, an aircraft's actual position may be compared to a commanded position of the aircraft. In another step, an autopilot system may be used to determine altitude error and altitude rate error values. In an additional step, the altitude error and altitude rate error values may be passed through a set of criteria to determine if action should be taken. No more steps of the method may be followed if the altitude error and altitude rate error values do not meet the criteria for action. If the altitude error and altitude rate error values do meet the criteria, in yet another step, the altitude error and altitude rate error values may be multiplied by at least one gain signal to produce two delta lift commands. In an additional step, the two delta lift commands may be summed to produce a single delta lift command. In another step, the single delta lift command may be used in unison with a conventional vertical position feedback elevator control loop to maintain the commanded position of the aircraft.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
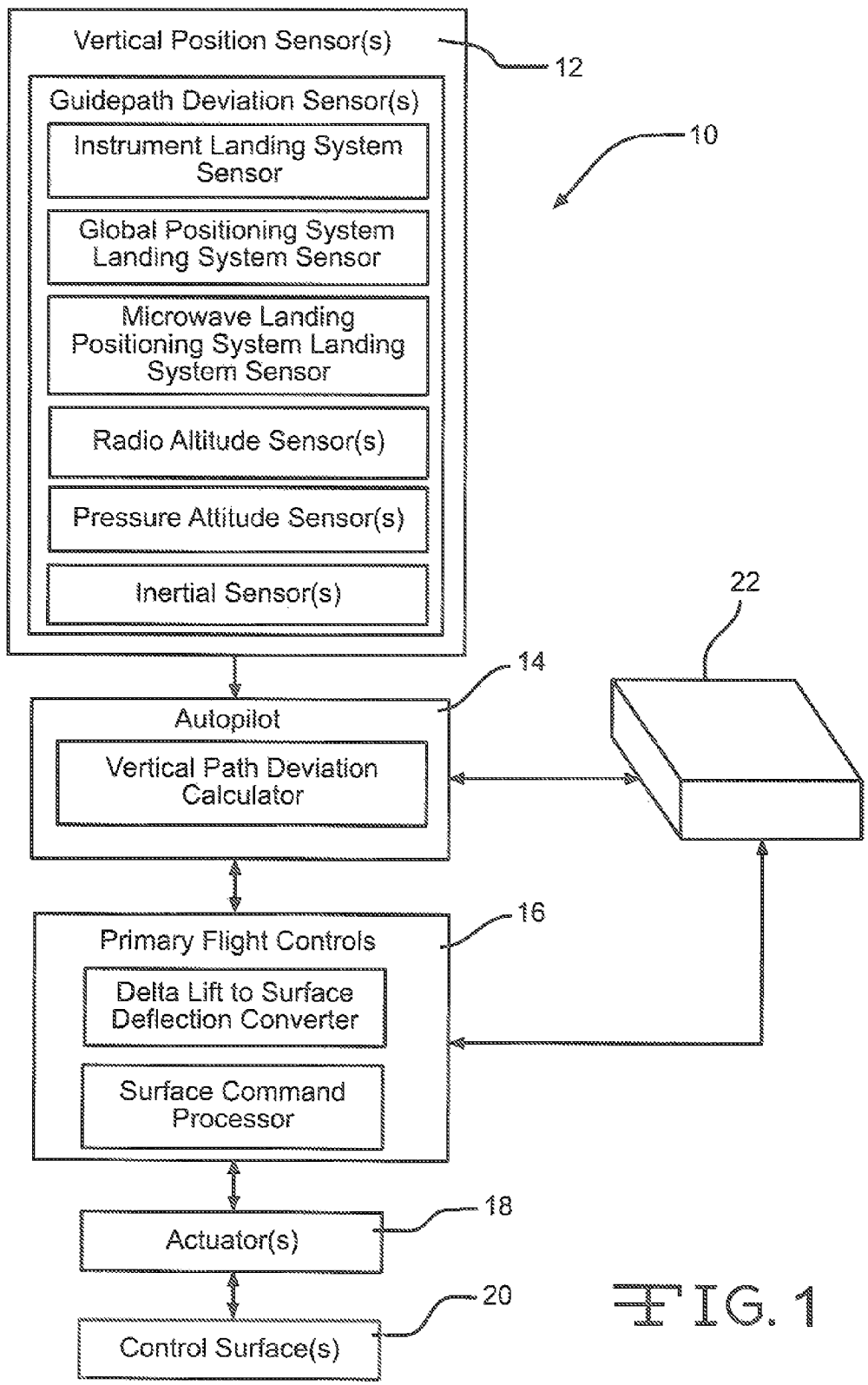
FIG. 1 shows a system block diagram which may be used under one embodiment of the disclosure.

FIG. 1 shows a system block diagram 10 which may be used under one embodiment of the disclosure. The system 10 may include sensors 12, an autopilot system 14, a flight control system 16, one or more actuators 18, one or more control surfaces 20, and one or more computers 22. The sensors 12 may comprise one or more of a vertical path sensor, a glidepath sensor, an instrument landing system sensor, a global positioning system sensor, a microwave landing positioning system landing system sensor, a radio altitude sensor, a pressure altitude sensor, an inertial sensor, and/or one or more other types of sensors.

The autopilot system 14 may comprise a vertical path deviation calculator, and/or other types of autopilot devices. The flight control system 16 may comprise one or more of a delta lift to surface deflection converter, a surface command processor, and/or other types of flight control functions. The one or more actuators 18 may comprise one or more devices that may be used to move the control surfaces 20. The one or more computers 22 may comprise a vertical position feedback symmetric lateral control surface deflection (or direct lift) computer. The one or more computers 22 may further comprise one or more of a processor, a memory, an autopilot interface module, a flight control interface module, and/or other types of computer systems. In other embodiments, the one or more computers 22 may comprise a separate processing computer, may be embedded in the autopilot system 14, and/or may be embedded in the flight control system 16.

Figure 2:
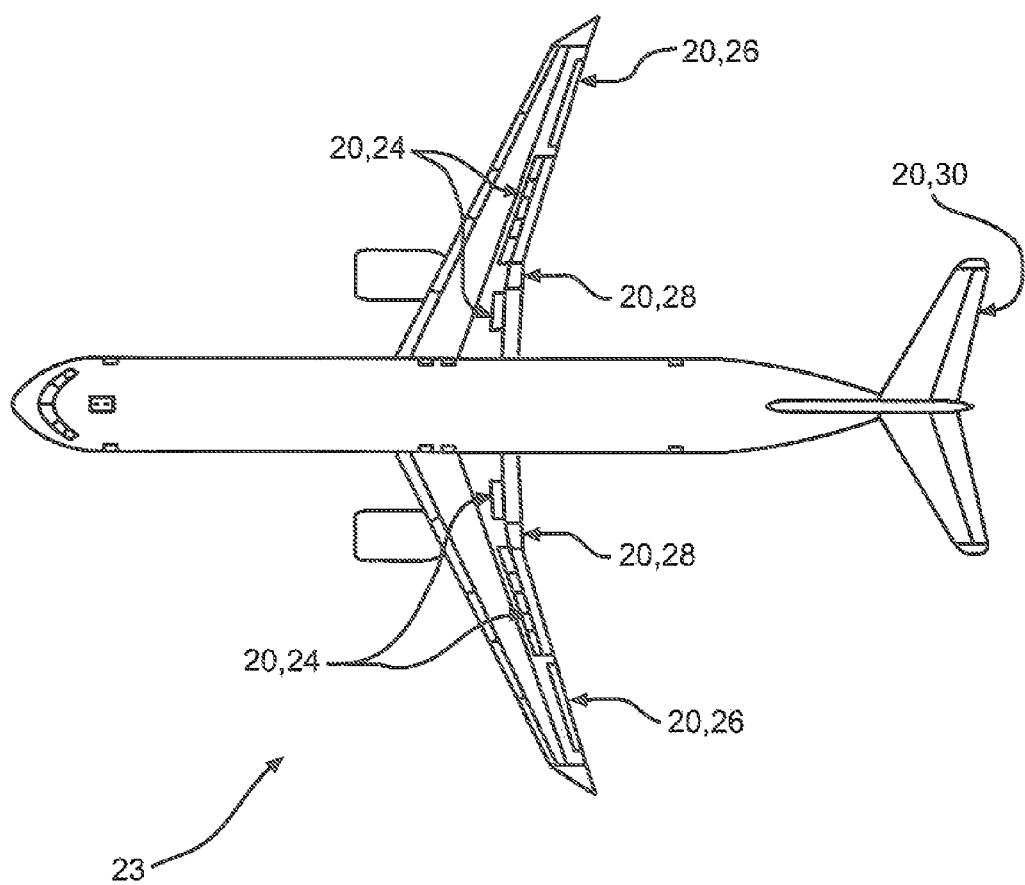
FIG. 2 shows a top view of one embodiment of control surfaces of an aircraft.

As shown in FIG. 2, which shows a top view of one embodiment of control surfaces 20 of an aircraft 23, the control surfaces 20 may comprise spoilers 24, ailerons 26, flaperons 28, an elevator 30, and/or other types of control surfaces. The spoilers 24 may be deflected asymmetrically for lateral control, and/or can be symmetrically deflected for longitudinal control, and/or lift generation/reduction. The ailerons 26 may be deflected asymmetrically for lateral control, and/or may be symmetrically deflected for longitudinal control and/or lift generation. The flaperons 28 may be deflected asymmetrically for lateral control, and/or may be symmetrically deflected for longitudinal control and/or lift generation. The elevator 30 may comprise a longitudinal control surface.

Figure 3:
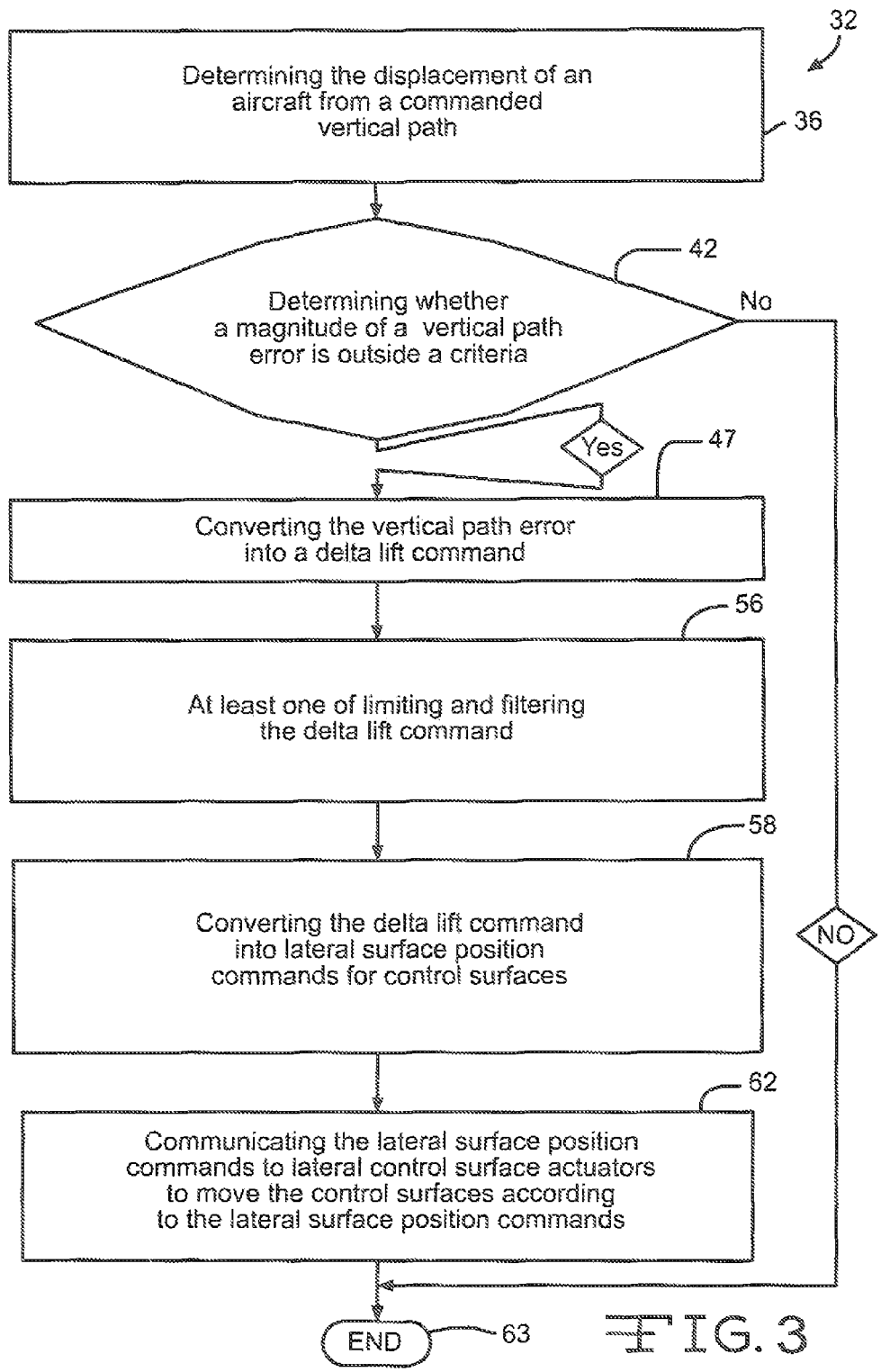
FIG. 3 shows a flowchart of one embodiment of a method for reducing vertical position errors in an aircraft.
Figure 4:
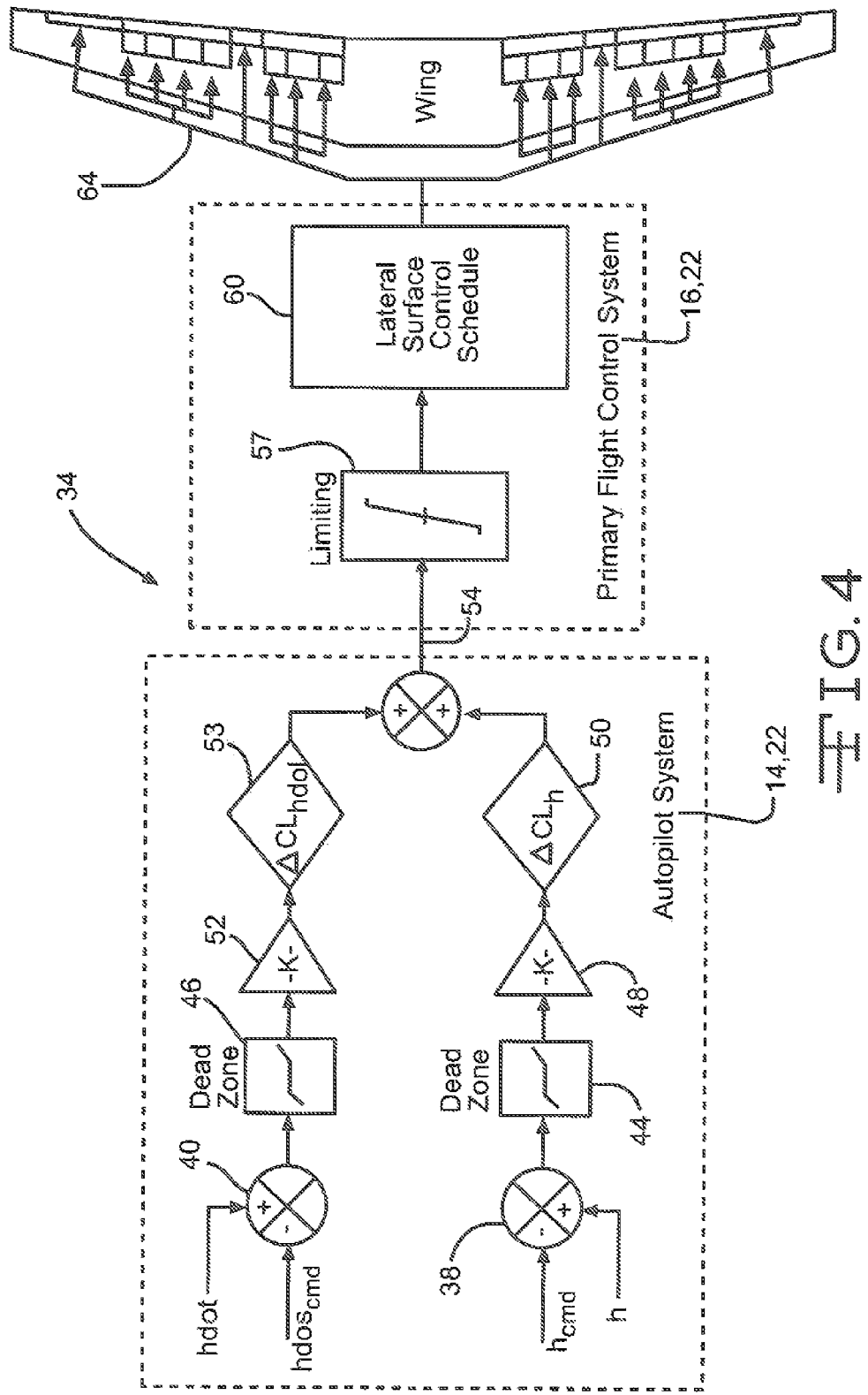
FIG. 4 shows one embodiment of a block diagram which may be followed to implement the method of FIG. 3.

FIG. 3 shows a flowchart of one embodiment of a method 32 for reducing vertical position errors in an aircraft 23. FIG. 4 shows one embodiment of a block diagram 34 which may be followed to implement the method 32 of FIG. 3. As shown in FIG. 3, in step 36 the aircraft's displacement from its commanded vertical path may be determined. This may be done utilizing the aircraft's autopilot's conventional elevator feedback vertical position control law using the computer 22. This vertical displacement may comprise the aircraft's vertical path error signal which may be determined by the autopilot system 14 utilizing the aircraft's sensors 12 and signal synthesis to determine the aircraft's actual vertical position relative to the aircraft's commanded vertical position. The aircraft's glideslope signal, radio altimeter signal, and/or other types of signals, devices, and/or mechanisms may be used to assist in determining the aircraft's displacement from the commanded vertical path. The vertical displacement of the aircraft 23 may be caused by a disturbance, such as a wind gust, glideslope beam bend, and/or due to abrupt changes in radio altitude caused by changing terrain.

Step 36 may further comprise, as shown in FIG. 4, determining both the altitude error signal 38 and the altitude rate error signal 40 using the automatic pilot system's 14 vertical position control law and/or computer 22. These altitude and altitude rate error signals 38 and 40 respectively may indicate the difference in the commanded vertical position and vertical rate from the actual vertical position and vertical rate of the aircraft 23.

In step 42 a determination may be made using the computer 22 as to whether the magnitude of the vertical path error is outside (exceeds) a set of criteria such as a threshold or one of a set of predetermined criteria (represented as a deadzone/deadzone filter/and/or filter) and therefore warrants a deflection of the lateral control surfaces 20. Factors such as actuator wear, surface fatigue, and system stability may be considered in setting the criteria. Step 42 may comprise sending/passing the altitude error signal 38 through a set of criteria (e.g., deadzone/deadzone filter/and/or filter) 44 and the altitude rate error signal 40 through a set of criteria (similarly represented, e.g., as a deadzone/deadzone filter/and/or filter) using the autopilot system 14 and/or computer 22.

As shown in FIG. 3, if the vertical path error does not exceed the criteria to warrant a deflection of the lateral control surfaces, the method may conclude/end 63 without doing/completing any more steps of the method. If the vertical path error exceeds the criteria, then in step 47 the vertical path error may be converted into a delta lift command using the computer 22 shown in FIG. 1. The delta lift command may be proportional to the vertical position error. Step 47 may comprise, as shown in FIG. 4, using the autopilot system 14 and/or computer 22 to multiply the altitude error signal 38 by a first gain signal 48 to produce a first delta lift command 50, to multiply the altitude rate error signal 40 by a second gain signal 52 to produce a second delta lift command 53, and to sum the first delta lift command 50 and the second delta lift command 53 to obtain the single (or total) delta lift command 54. The gains K may be determined using methods well-known to those skilled in the art. The first and second gain signals 48 and 52 may be identical. In other embodiments, the first and second gain signals 48 and 52 may vary.

In step 56 the delta lift command 54 may be limited and/or filtered. This may occur by communicating (passing) on the delta lift command 54 to the flight control system 16 and limiting and/or filtering the delta lift command 54 using the computer 22. The limiting and/or filtering could be done in computer 22 or in the flight control system 16 based on the delta lift available from the lateral control surface deflections to prevent command saturation. In other embodiments, the limiting and/or filtering may be done by the autopilot system 14. Step 56 may comprise, as shown in FIG. 4, limiting and/or filtering 57 the delta lift command 54 using the flight control system 16 and/or computer 22. This limiting and/or filtering may prevent commanding more delta lift than is available with the applicable lateral control surfaces 20 shown in FIG. 2. If any of the input signals are exceptionally noisy, then appropriate filtering of the delta lift command 54 may be applied. Other sorts of limiting and/or filtering may also be applied as appropriate.

In step 58 the delta lift command 54, which may have been limited and/or filtering in step 56, may then be converted using the computer 22 into lateral surface position commands for the control surfaces 20 by the flight control system 16, such as the spoiler 24, the flaperon 28, and/or other control surfaces 20. In other embodiments, the limited and/or filtered delta lift command 54 may be converted into lateral surface position commands for the control surfaces 20 by the autopilot system 14. The lateral surface position commands may comprise symmetric lateral control surface commands for the control surfaces 20. Step 58 may comprise, as shown in FIG. 4, converting the delta lift command 54 (which may have been limited) into lateral surface position commands 60 using the flight control system 16 and/or computer 22.

In step 62, the lateral surface position commands may be communicated using the computer 22 to the lateral control surface actuators 18 which may control/move the control surfaces 20 according to the lateral surface position commands using the flight control system 16. In other embodiments, the autopilot system 14 may communicate the lateral surface position commands to the lateral control surface actuators 18 to control/move the control surfaces 20 according to the lateral surface position commands. The feedback control loop may work in parallel/unison with the conventional vertical position feedback elevator control loop (the elevator command) to maintain the commanded vertical path of the aircraft 23 and to correspondingly reduce vertical position error. Step 62 may comprise communicating 64 the lateral surface position commands to the lateral control surface actuators 18 to control/move the control surfaces 20 using the flight control system 16.

The embodiments of the disclosure may be used to enhance the accuracy of the automatic pilot vertical position command tracking task provided by one or more of the conventional longitudinal control systems. The enhancement may be achieved by using a vertical position feedback control to produce commands that result in symmetric deflections of lateral control surfaces on the aircraft's wings for the purpose of augmenting the autopilot's existing vertical position control. Symmetric deflections of the wing's lateral control surfaces may result in small changes in lift. The commands may be proportional to the vertical path error signal used to drive a conventional longitudinal control system. In such manner, vertical position command tracking may be improved during an automatic landing. However, the embodiments of the disclosure could be applied to any phase of flight where a vertical position control strategy is utilized.

For automatic landings, the improved vertical position command tracking achieved by one or more embodiments of the disclosure may increase the robustness and improve the performance of an existing automatic landing system. Symmetric deflections of the lateral control surfaces may produce significantly less pitching movement than elevator deflections. Therefore, one or more embodiments of the disclosure may provide a unique way to improve vertical position command tracking during an automatic landing without creating pitch activity that may be objectionable to the flight crew or requiring excessively high vertical position feedback gains that may compromise system stability. The development and certification of an automatic landing system may be a costly endeavor, requiring extensive flight testing, gain tuning, and simulation model updates. A more robust automatic landing system may be less sensitive to discrepancies between the simulation models for aerodynamic and sensors and the actual aircraft aerodynamics and sensor characteristics, and may therefore reduce the overall cost and design refinement involved in certification of the automatic landing system. Additionally, lower vertical position feedback gains may reduce the possibility of structural mode interaction.

It should be understood, of course, that the foregoing relates to exemplary embodiments of the disclosure and that modifications may be made without departing from the scope of the disclosure as set forth in the following claims.

The invention claimed is:

1. A method comprising:
   adjusting an elevator of an aircraft to control the aircraft to follow a commanded flight path during landing, the commanded flight path including a commanded altitude and a commanded vertical rate;
   determining an altitude error corresponding to a difference between the commanded altitude and an actual altitude of the aircraft;
   determining an altitude rate error corresponding to a difference between the commanded vertical rate and an actual vertical rate of the aircraft;
   determining a magnitude of at least one of the altitude error and altitude rate error; and
   reducing vertical position error by adjusting control surfaces on wings of the aircraft symmetrically only when the magnitude of at least one of the altitude error and the altitude rate error exceeds a criteria.

2. The method of claim 1, wherein a deadzone is independently applied to each signal representing altitude error and altitude rate error, wherein first and second delta lift commands are generated from the deadzones, and wherein a sum of the first and second delta lift commands is used to adjust the wing control surfaces.

3. The method of claim 2, wherein a first gain is applied to the deadzone-filtered altitude error to produce the first delta lift command, and a second gain is applied to the deadzone-filtered altitude rate error to produce the second delta lift command.

4. The method of claim 1, wherein the control surfaces are adjusted during a flare maneuver.

5. The method of claim 1, wherein the change in lift is produced by symmetric deflections of lateral control surfaces on the wings.

6. An automatic landing system for an aircraft having wing control surfaces, the system comprising:
a processor programmed to:
adjust an elevator of the aircraft to control the aircraft to follow a commanded flight path during landing, the commanded flight path including a commanded altitude and a commanded vertical rate;
determine an altitude error corresponding to a difference between the commanded altitude and an actual altitude of the aircraft;
determine an altitude rate error corresponding to a difference between the commanded vertical rate and an actual vertical rate of the aircraft;
determine a magnitude of at least one of the altitude error and altitude rate error; and
reduce vertical position error during landing by commanding the wing control surfaces to adjust symmetrically only when the magnitude of at least one of the altitude error and the altitude rate error exceeds the criteria.

7. The system of claim 6, wherein the processor is programmed to apply deadzones to signals representing altitude error and altitude rate error, apply gains to outputs of the deadzones to produce first and second delta lift commands, and sum the first and second delta lift commands.

8. The system of claim 6, wherein the processor is programmed to command the control surfaces during a flare maneuver.

9. The system of claim 6, wherein the processor is programmed to command the change in lift by commanding symmetric deflections of lateral control surfaces on the wings.

10. The method of claim 1, in which the criteria is based on at least one of actuator wear, surface fatigue, and system stability.

11. The method of claim 1, in which the criteria is based on a non-zero threshold value.

12. The system of claim 6, in which the criteria is based on at least one of actuator wear, surface fatigue, and system stability.

13. The system of claim 6, in which the criteria is based on a non-zero threshold value.

* * * * *